United States Patent
Wang et al.

(10) Patent No.: US 8,027,080 B2
(45) Date of Patent: Sep. 27, 2011

(54) TRANSFLECTIVE ELECTRO-WETTING DISPLAY DEVICE

(75) Inventors: Chien-Wen Wang, Miao-Li (TW); Sung-Yen Chen, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 116 days.

(21) Appl. No.: 12/220,514

(22) Filed: Jul. 25, 2008

(65) Prior Publication Data
US 2009/0027760 A1    Jan. 29, 2009

(30) Foreign Application Priority Data
Jul. 25, 2007   (CN) .......................... 2007 1 0075320

(51) Int. Cl.
*G02B 26/02* (2006.01)
*G02B 26/00* (2006.01)
(52) U.S. Cl. .................. 359/291; 359/297; 359/228
(58) Field of Classification Search ......... 359/227–228, 359/290–297, 665–666; 345/87–89, 16–23
See application file for complete search history.

(56) References Cited

U.S. PATENT DOCUMENTS

| | | | |
|---|---|---|---|
| 7,561,131 B2 | 7/2009 | Ijzerman et al. | |
| 7,573,551 B2 * | 8/2009 | Koma et al. | 349/114 |
| 2006/0200106 A1 | 9/2006 | Okubo | |
| 2007/0263306 A1 | 11/2007 | Hayes et al. | |
| 2008/0297880 A1 * | 12/2008 | Steckl et al. | 359/291 |

FOREIGN PATENT DOCUMENTS

| | | |
|---|---|---|
| CN | 1754113 A | 3/2006 |
| WO | 2006017129 A2 | 2/2006 |

* cited by examiner

*Primary Examiner* — Scott J Sugarman
*Assistant Examiner* — Zachary Wilkes
(74) *Attorney, Agent, or Firm* — Altis Law Group, Inc.

(57) ABSTRACT

An exemplary transflective electro-wetting display (EWD) device includes an upper substrate, a lower substrate opposite to the upper substrate, a first polar liquid disposed between the upper and lower substrates, a second, colored, non-polar liquid disposed between the upper and lower substrates, and a reflective pattern disposed at the lower substrate. The second liquid is immiscible with the first liquid. An area of the reflective pattern covered by the second liquid varies according to an area of the lower substrate covered by the second liquid.

2 Claims, 3 Drawing Sheets

TRANSFLECTIVE ELECTRO-WETTING DISPLAY DEVICE

FIELD OF THE INVENTION

The present invention relates to display devices, and more particularly to a transflective electro-wetting display device having first and second immiscible fluid within a space between a first transparent support plate and a second support plate.

GENERAL BACKGROUND

Display devices like TFT-LCDs (thin film transistor liquid crystal displays) are used in laptop computers, but also find an increasingly wider application in GSM telephones. Instead of LCDs, for example, (polymer) LED display devices are also being used. Apart from these types of displays, other display techniques, such as electro-wetting display (EWD) devices, which are suitable for flat plate displays are evolving. The electro-wetting functionality provides displays with excellent brightness and contrast, and relatively low power consumption compared to many other display technologies.

However, when the ambient environment is dark, the reflection of ambient light by the EWD devices is limited. The visibility of the reflective EWD device is poor. Conversely, a transmission type EWD device is disadvantageous when the ambient environment is bright.

It is, therefore, needed to provide a transflective EWD device that can overcome the above-described deficiencies.

SUMMARY

A transflective electro-wetting display device includes an upper substrate, a lower substrate opposite to the upper substrate, a first polar liquid disposed between the upper and lower substrates, a second, colored, non-polar liquid disposed between the upper and lower substrates, and a reflective pattern disposed at the lower substrate. The second liquid is immiscible with the first liquid. An area of the reflective pattern covered by the second liquid varies according to an area of the lower substrate covered by the second liquid.

A transflective electro-wetting display device includes an upper substrate; a lower substrate opposite to the upper substrate; a first polar liquid disposed between the upper and lower substrates; a second, colored, non-polar liquid disposed between the upper and lower substrates, and the second liquid being immiscible with the first liquid; a transparent electrode disposed at a surface of the lower substrate; and a reflective pattern disposed at the lower substrate. Gray scales of images displayed by the reflective pattern vary according to video signals supplying to the first liquid and the transparent electrode.

Other novel features and advantages will become more apparent from the following detailed description when taken in conjunction with the accompanying drawings, in which:

DETAILED DESCRIPTION OF PREFERRED EMBODIMENTS

Reference will now be made to the drawings to describe preferred and exemplary embodiments of the present invention in detail.

Figure 1:
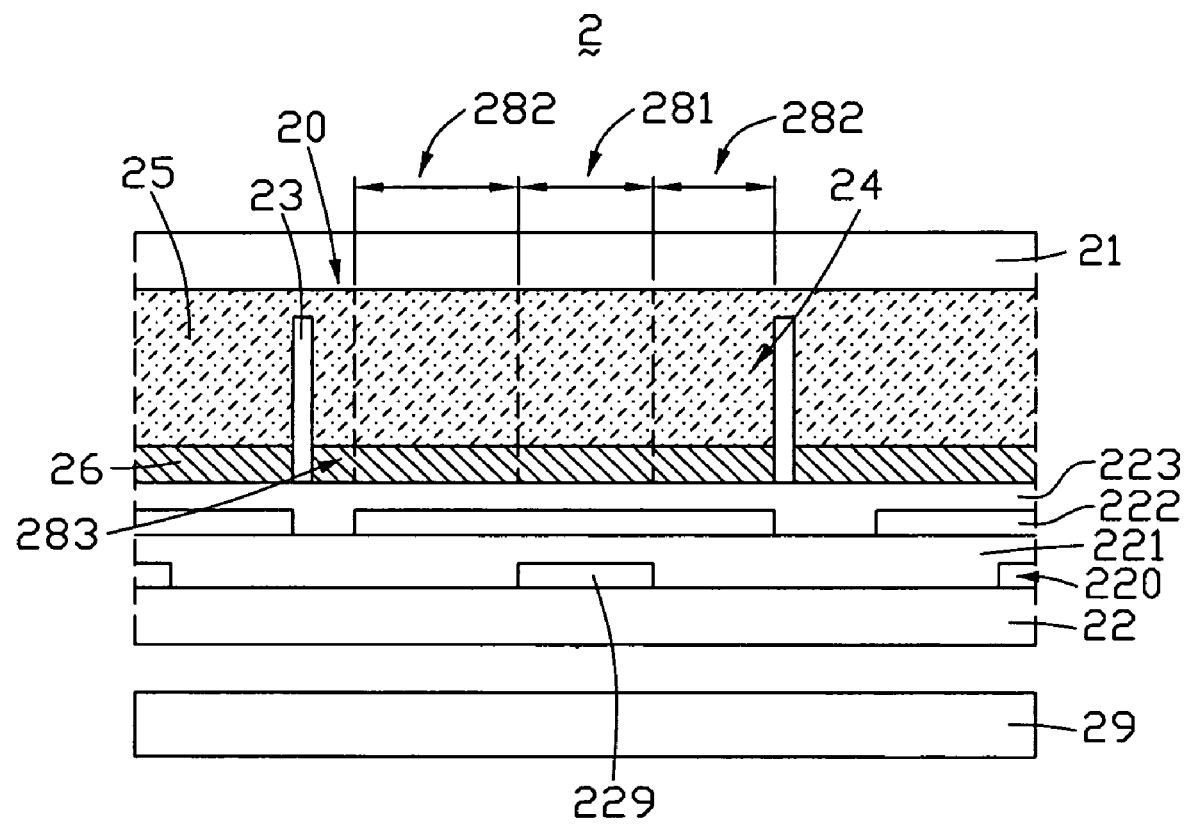
FIG. 1 is a side, cross-sectional view of parts of a reflective EWD device according to a first embodiment of the present invention, the EWD including a plurality of pixel units.

Referring to FIG. 1, a side, cross-sectional view of parts of a reflective EWD device 2 according to a first embodiment of the present invention is shown. The EWD device 2 includes an upper substrate 21, a lower substrate 22 disposed parallel to and spaced apart from the upper substrate 21, and a plurality of side walls 23 interposed between the upper and lower substrates 21, 22. The side walls 23 are arranged in a matrix and cooperate with the upper and lower substrates 21, 22 to form a plurality of receiving spaces 24. The side walls 23 also divide the transflective EWD device 2 into a multiplicity of pixel units 20 in an array type. The upper and lower substrates 21, 22 are made of transparent material, such as glass, plastic or the like. A backlight module 29 is disposed under the lower substrate 22 for providing light beams.

The space 24 of each of the pixel units 20 is filled with a first liquid 25 and a second liquid 26. The first liquid 25 is polar, conductive water solution or salt solution, such as a solution mixed with Ethyl Alcohol and potassium chloride solution. The second liquid 26 is non-polar, insulative liquid, such as oil, Alkane, Hexadecane or the like. The second liquid 26 can be colored with a dye (or in some cases pigment), and serves as a shielding liquid. The first and second liquid 45, 46 are immiscible.

The lower substrate 22 includes a reflective pattern 220 having a plurality of individual reflective members 229, a first insulating layer 221, a plurality of transparent electrodes 222, a second insulating layer 223. The reflective members 229 of the reflective pattern 220 may be made of AlNd, Ti, Ag, or the like, and the transparent electrodes 222 may be made of indium-tin-oxide (ITO). Further, the second insulating layer 223 may be made of hydrophobic material, such as an amorphous fluoropolymer.

Each of the pixel units 20 includes a reflective region 281, a transmission region 282, and a storage region 283. Each of the transparent electrodes 222 corresponds to a corresponding pixel unit 20, and each of the reflective members 229 corresponds to the reflective region 281 in each pixel unit 20. Further, the transparent electrode 222 defines an opening (not labeled) at a corner of the each pixel 20, so as to form a storage region 283 in each pixel unit 20. The storage region 283 is used to contain the second liquid 26 being pushed by the first liquid 25 when the pixel unit 20 is in a white state.

Figure 2:
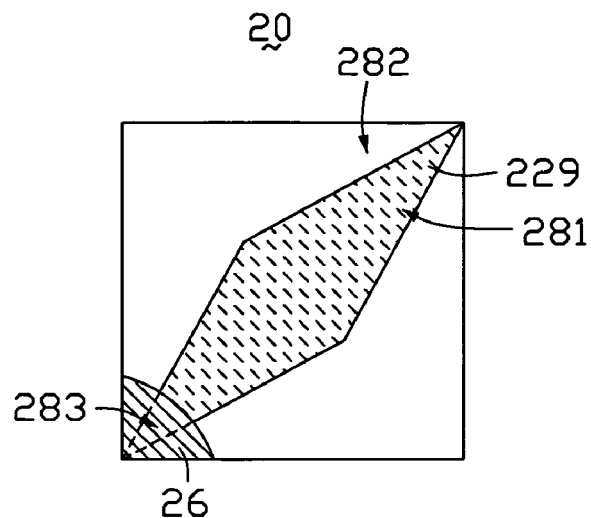
FIG. 2 is a top, plan view of one of the pixel units of the transflective EWD device of FIG. 1.

Also referring to FIG. 2, a top, plan view of one of the pixel units 20 of the transflective EWD device 2 is shown. The reflective member 229 has a rhombic shape, and a long diagonal of the reflective member 229 overlaps a diagonal of the pixel unit 20 crossing the storage region 283. That is, parts of the reflective member 229 overlaps with parts of the storage region 283.

In a initial state, the second liquid 26 covers all the pixel units 20, and the pixel units 20 display a black image. When voltage signals are provided between the first liquid 25 and the electrodes 222 of the pixel units 20, the second liquid 26 may be pushed by the first liquid 25 and concentrate in the storage region 283. During this operation process, an area of the reflective members 229 covered by the second liquid 26 varies according to an area of the lower substrate 26 covered by the second liquid 26.

The relationship between areas of the reflective region 281, the transmission region 282, and the pixel unit 20 that being covered by the second liquid 26 is described as follow. The pixel unit 20 has a square shape, and a diagonal of which is A. A diagonal of the rhombic reflective member 229 is B, and suppose that an edge of the second liquid 26 is a line and is perpendicular to a moving direction thereof. That is, the edge of the second liquid is parallel to a short diagonal of the reflective member 229. At a time, a ratio of an area of the reflective region 281 covered by the second liquid 26 to an area of the transmission region 282 covered by the second liquid 26 is approximate to a constant B/(A−B). A ratio of an area of the reflective region 281 covered by the second liquid 26 to an area of the pixel unit 20 covered by the second liquid 26 is approximate to a constant B/A. Therefore, the area of the transmission regions 282 covered by the second liquid 26 varies according to a direct proportional function relate to the area of lower substrate 22 covered by the second liquid 26.

When several voltage signals are supplied to the pixel unit 20 to enable the pixel unit 20 to change from a black state to a white state, both of the area of the reflective region 281 and the transmission region 282 covered by the second liquid 26 are varied accordingly. The EWD device 2 may sets the ratio of the area of the transmission region 282 covered by the second liquid 26 to the area of the reflective region 281 covered by the second liquid 26 in a range from 0.2 to 10, to ensure it obtaining high and uniform optical performance.

The transflective EWD device 2 installs the reflective pattern 220 having a plurality of rhombic reflective members 229, which enables the area of the reflective region 281 covered by the second liquid 26 to vary during the process of applying voltage signals to make pixel unit 20 display images in different gray scales. That is, the area of the reflective pattern 220 covered by the second liquid 26 varies according to the area of the lower substrate 22 covered by the second liquid 26. Therefore, each voltage signal enables the reflective region 281 to display an image with desired gray scale. Then, the transflective EWD device 2 has a high optical performance.

With these configurations described above, the area of the transmission region 282 covered by the second liquid 26 varies according to the area of the lower substrate 22 covered by the second liquid 26, so as to enables the transmission region 282 to display an image in a high optical performance.

Figure 3:
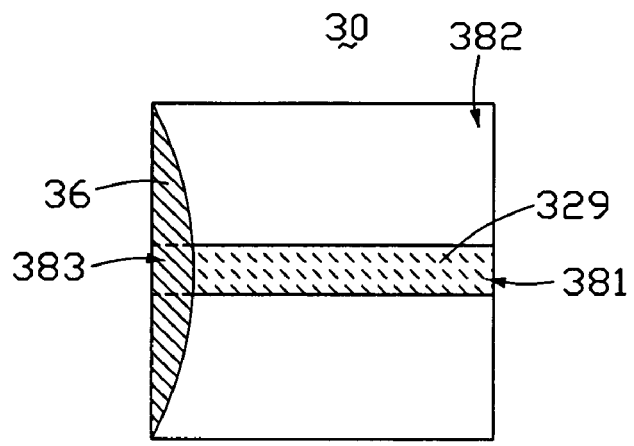
FIG. 3 is a top, plan view of a pixel unit of a transflective EWD device according to a second embodiment of the present invention.

Referring to FIG. 3, a top, plan view of a pixel unit of a transflective EWD device according to a second embodiment of the present invention is shown. The transflective EWD device has a structure similar to that of the transflective EWD device 2. However, a pixel unit 30 of the transflective EWD device has a storage region 383 disposed at a side of a pixel unit 30. The pixel unit 30 has a reflective member 329 extended from the storage region 383 to another side of the pixel unit 30.

In operation, the area of the reflective region 381 and the area of the transmission region 382 that are covered by the second liquid 36 may vary according to different voltage signals corresponding to different gray scales.

Figure 4:
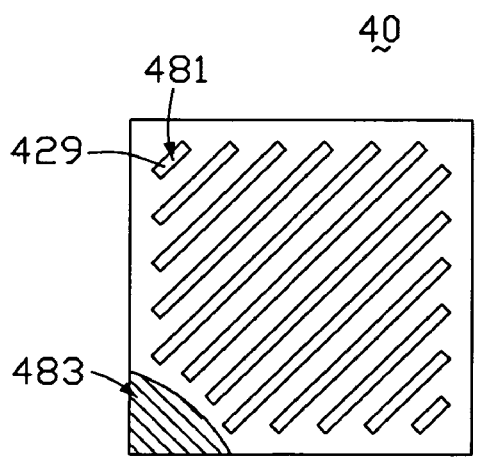
FIG. 4 is a top, plan view of a pixel unit of a transflective EWD device according to a third embodiment of the present invention.

Referring to FIG. 4, a top, plan view of a pixel unit of a transflective EWD device according to a third embodiment of the present invention is shown. The transflective EWD device has a structure similar to that of the transflective EWD device 2. However, a pixel unit 40 of the transflective EWD device has a reflective member 429 with a plurality of parallel and individual strip portions, and each strip portion corresponds to the reflective region 481. The reflective member 429 extends from the storage region 483 to an opposite corner of the pixel unit 40.

Figure 5:
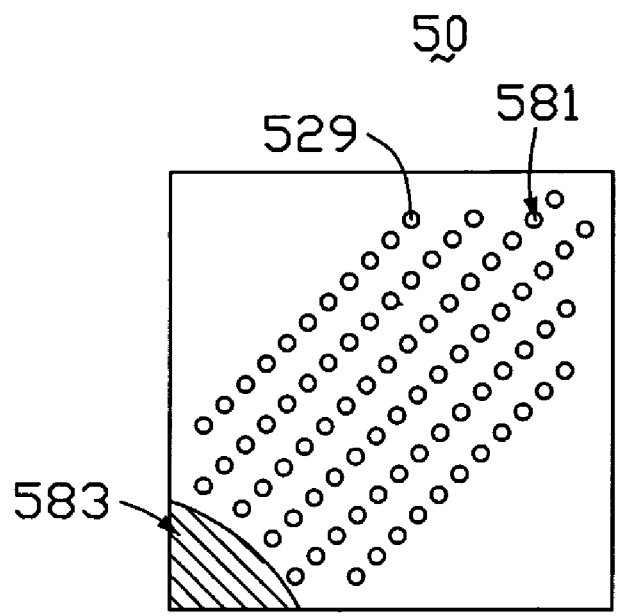
FIG. 5 is a top, plan view of a pixel unit of a transflective EWD device according to a fourth embodiment of the present invention.

Referring to FIG. 5, a top, plan view of a pixel unit of a transflective EWD device according to a fourth embodiment of the present invention is shown. The transflective EWD device has a structure similar to that of the transflective EWD device 2. However, a pixel unit 50 of the transflective EWD device has a reflective member 529 disposed in a dot-pattern, and the dot-pattern corresponds to a reflective region 581. The reflective member 529 extends from the storage region 583 to an opposite corner of the pixel unit 50.

Figure 6:
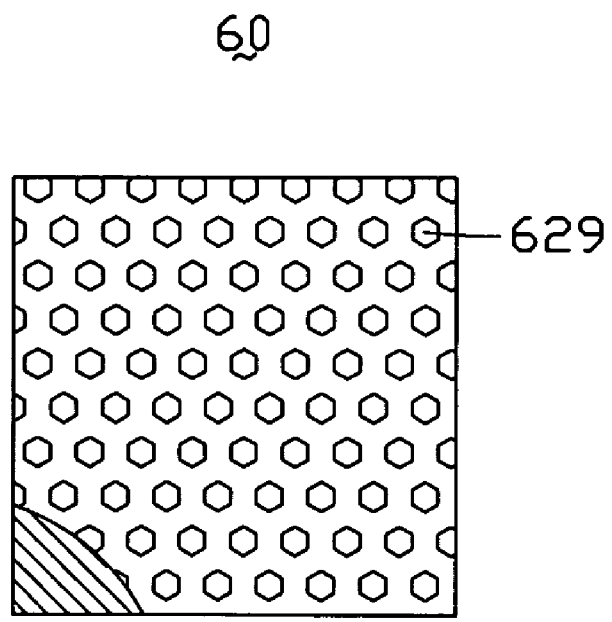
FIG. 6 is a top, plan view of a pixel unit of a transflective EWD device according to a fifth embodiment of the present invention.

Referring to FIG. 6, a top, plan view of a pixel unit of a transflective EWD device according to a fifth embodiment of the present invention is shown. The transflective EWD device has a structure similar to that of the transflective EWD device 2. However, a pixel unit 60 of the transflective EWD device has a reflective member disposed in a dot-pattern, and each dot 629 of the dot-pattern has a hexagon shape.

Various modifications and alterations are possible within the ambit of the invention herein. For example, the reflective pattern 220 may disposed on the first insulating layer 221 or on the transparent electrode 222.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of arrangement of parts) within the principles of the invention to the full extent indicated by the broad general meaning of the terms in which the appended claims are expressed.

What is claimed is:

1. A transflective electro-wetting display device, comprising:
    an upper substrate;
    a lower substrate opposite to the upper substrate;
    a first polar liquid disposed between the upper and lower substrates;
    a second, colored, non-polar liquid disposed between the upper and lower substrates, and the second liquid being immiscible with the first liquid;
    a plurality of pixel units, each pixel unit defining a storage region for containing the second liquid, an area of the lower substrate covered by the second liquid being adjusted via controlling the second liquid to concentrate in the storage region; and
    a reflective pattern disposed at the lower substrate, the reflective pattern comprising a plurality of reflective members, each reflective member corresponding to each pixel unit, and each reflective member extending from the storage region of the pixel unit to another side of the pixel unit opposite to the storage region;
    wherein each pixel unit has a rectangular shape; each storage region is disposed at a corner of each pixel unit; each reflective member has a rhombic shape; and a diagonal of each reflective member overlaps a diagonal of each pixel unit crossing each storage region.

2. The transflective electro-wetting display device as claimed in claim 1, wherein the transflective electro-wetting display device comprises a reflective region and a transmission region, and the reflective region corresponds to reflective pattern.

* * * * *